(12) United States Patent
Schultz

(10) Patent No.: US 8,004,232 B2
(45) Date of Patent: Aug. 23, 2011

(54) METHOD OF BATTERY CHARGING AND POWER CONTROL IN CONJUNCTION WITH MAXIMUM POWER POINT TRACKING

(75) Inventor: Aaron Schultz, San Jose, CA (US)

(73) Assignee: MiaSole, Santa Clara, CA (US)

( * ) Notice: Subject to any disclaimer, the term of this patent is extended or adjusted under 35 U.S.C. 154(b) by 328 days.

(21) Appl. No.: 12/472,762

(22) Filed: May 27, 2009

(65) Prior Publication Data

US 2010/0301797 A1 Dec. 2, 2010

(51) Int. Cl.
*H01M 10/46* (2006.01)
(52) U.S. Cl. ............... 320/101; 320/107; 320/162
(58) Field of Classification Search .............. None
See application file for complete search history.

(56) References Cited

U.S. PATENT DOCUMENTS

| | | | |
|---|---|---|---|
| 4,375,662 A * | 3/1983 | Baker | 363/95 |
| 7,834,580 B2 * | 11/2010 | Haines | 320/101 |
| 2006/0132102 A1 | 6/2006 | Harvey | |
| 2008/0278111 A1 * | 11/2008 | Genies et al. | 320/101 |
| 2010/0207571 A1 * | 8/2010 | English et al. | 320/101 |

FOREIGN PATENT DOCUMENTS

| | | |
|---|---|---|
| JP | 2005-160290 A | 6/2005 |
| KR | 10-2006-0091450 A | 8/2006 |
| KR | 10-2008-0092747 A | 10/2008 |

OTHER PUBLICATIONS

"Quality and Energy Yield of Modules and Photovoltaic Plants," Swiss Confederation, Swiss Federal Department for Environment, Transport, Energy & Communications, ISAAC-TISO, Aug. 2008, 123pgs.
International Search Authority: Korean Intellectual Property Office (ISA/KR). International Search Report and Written Opinion, Intl. Application PCT/US10/36039. Dec. 22, 2010.

* cited by examiner

*Primary Examiner* — Vinh Nguyen
(74) *Attorney, Agent, or Firm* — The Marbury Law Group, PLLC

(57) ABSTRACT

A method of providing power includes providing no power to an output device if the output device cannot or should not use power. If the output device can use power, power is provided to the output device from an input source. If power available at the input source would not overload the output device, power is provided to the output device from the input source according to a maximum power point tracking algorithm. If power available at the input source would overload the output device, power is provided to the output device from the input source according to a target power.

30 Claims, 6 Drawing Sheets

METHOD OF BATTERY CHARGING AND POWER CONTROL IN CONJUNCTION WITH MAXIMUM POWER POINT TRACKING

BACKGROUND

The present invention relates generally to the field of power control and more specifically to power control related to maximum power point tracking.

Photovoltaic (PV) systems often employ methods of maximum power point tracking (MPPT). These methods enable delivery of all possible power from a PV array to a load. In some applications such as battery charging, there may be times when available PV power is greater than what the load can take.

Simultaneous with the need to cope with varying input and output powers, battery charging applications should control an output voltage. Whereas unconstrained MPPT systems deliver all possible power to some kind of a load, battery charging applications must additionally concern themselves with output voltage profiles. In some cases, a fully charged battery voltage cannot be exceeded. Most batteries typically have an ideal charging profile.

Thus, there is a need for improved power controllers that use MPPT. In particular, there is a need for improved battery chargers that use MPPT.

SUMMARY

A representative embodiment relates to a method of providing power. The method includes providing no power to an output device if the output device cannot or should not use power. If the output device can use power, power is provided to the output device from an input source. If power available at the input source would not overload the output device, power is provided to the output device from the input source according to a maximum power point tracking algorithm. If power available at the input source would overload the output device, power is provided to the output device from the input source according to a target power.

Another representative embodiment relates to a power apparatus. The power apparatus includes a power supply and a controller. The power supply includes a supply input and a supply output configured to be electrically connected to an output device. The controller controls the power supply. The controller includes a maximum power point tracker that monitors the supply input. The controller is configured to cause the power supply to provide no power to the supply output if the output device cannot or should not use power. The controller is also configured to cause the power supply to provide power to the supply output from the supply input if the output device can use power. If power available at the supply input would not overload the output device, the power supply provides power to the supply output from the supply input according to a maximum power point tracking algorithm performed by the maximum power point tracker. If the power available at the supply input would overload the output device, the power supply provides power to the supply output from the supply input according to a target power.

Another representative embodiment relates to a charging system. The system includes a photovoltaic device, a charging device electrically connected to the photovoltaic device, and a battery electrically connected to the charging device. The charging device includes a maximum power point tracker and a power supply. The charging device is configured to provide no power to the battery if the battery is fully charged. The charging device is also configured to provide power to the battery from the photovoltaic device if the battery is not fully charged. If a maximum power of the photovoltaic device would not overload the battery, the charging device provides power to the battery from the photovoltaic device according to a maximum power point tracking algorithm performed by the maximum power point tracker. If the maximum power of the photovoltaic device would overload the battery, the charging device provides power to the battery from the photovoltaic device according to a target power.

DETAILED DESCRIPTION

The need to combine and balance MPPT of an input power source and control of an output load lead to a development of an improved power controller, such as an improved battery charger that uses MPPT according to the embodiments of the present invention. A method of and device for battery charging and/or power control in conjunction with maximum power point tracking are described. In the following description, for purposes of explanation, numerous specific details are set forth to provide a thorough understanding of exemplary embodiments of the invention. It will be evident, however, to one skilled in the art that the invention may be practiced without these specific details. The drawings are not to scale. In other instances, well-known structures and devices are shown in simplified form to facilitate description of the representative embodiments.

Figure 1:
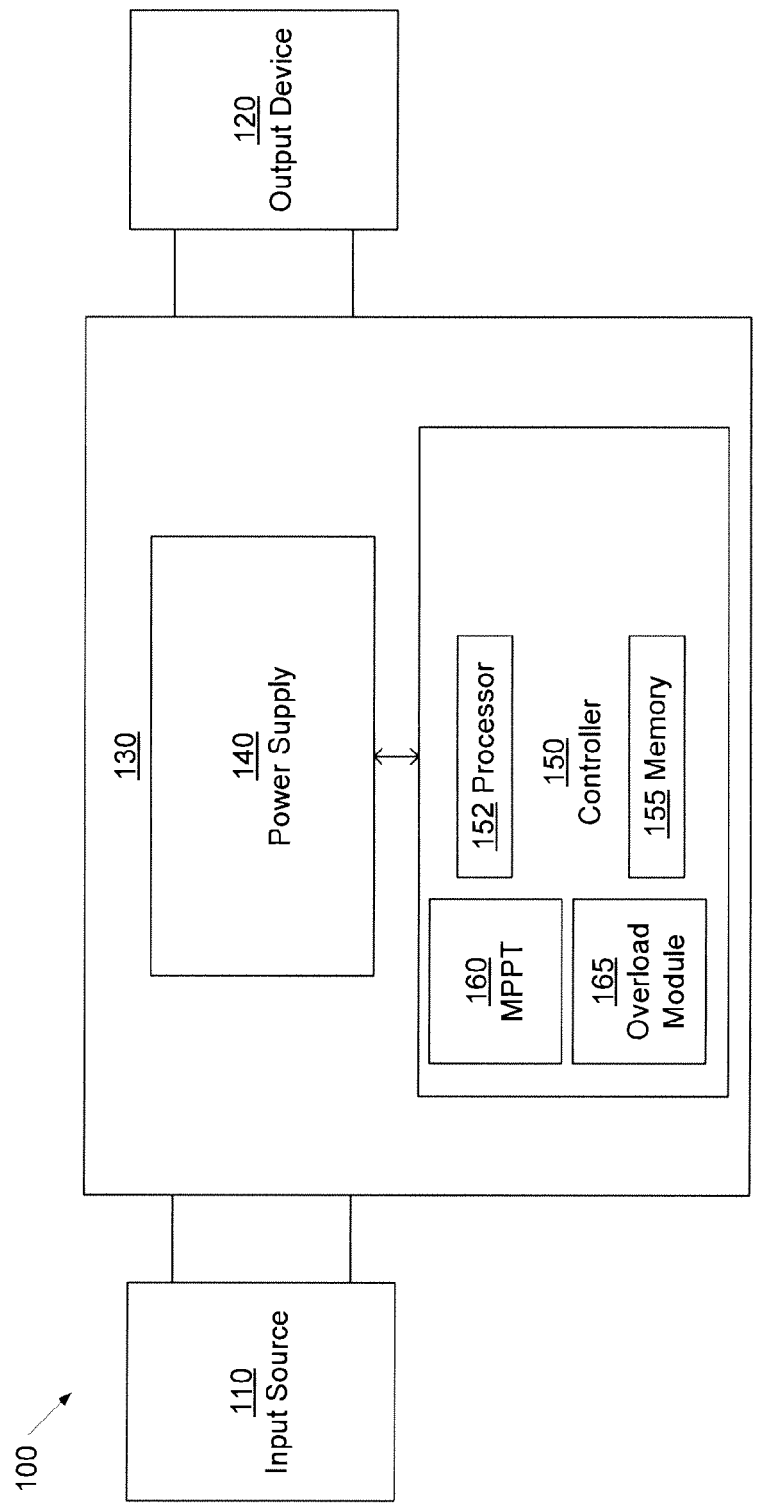
FIG. 1 is a diagram of a power regulation system in accordance with a representative embodiment.

Referring to FIG. 1, a diagram of a power regulation system 100 in accordance with a representative embodiment is shown. The power regulation system 100 includes an input source 110, an output device 120, and a power regulator 130. The input source 110 is electrically connected to a supply input of the power regulator 130. A supply output of the power regulator 130 is electrically connected to the output device 120.

The input source 110 can be any power source, for example, a photovoltaic (PV) device. The photovoltaic (PV) device can be a single cell, an array, or an array of arrays. Preferably, the input source is a power source that is well-suited for application of a maximum power point tracking (MPPT) algorithm.

The output device 120 can be any load, for example a battery or an electrical load. The battery can be any battery including a lead-acid, valve regulated lead-acid (VRLA) (a.k.a. a sealed lead-acid battery), alkaline, nickel-iron, nickel-cadmium, nickel hydrogen, nickel-metal hydride, nickel-zinc, lithium ion, lithium polymer, lithium iron phosphate, lithium sulfur, nano titanate, thin film lithium, zinc-bromine, vanadium redox, sodium-sulfur, molten salt, super iron or silver zinc battery. Each battery type has a different charging profile that defines the optimal way to charge the battery given factors, such as speed of charging, safety, battery longevity, battery chemistry, etc. Alternatively, the electrical load can be an appliance, a power converter, a building electrical system, the electrical grid or any other electrical device that preferably uses a constant voltage or current.

The power regulator 130 includes a power supply 140 and a controller 150. The controller 150 controls the power supply 140, for example, by regulating the switching characteristics of the power supply 140. The controller 150 can be integrated into the power supply 140. The controller 150 includes a maximum power point tracker 160, an overload module 165, a processor 152, and a memory 155. The controller can be one integrated circuit, such as an ASIC, or separate modules. Alternatively, the controller may comprise a special or general purpose computer.

The processor 152 is configured to execute instructions stored in memory 155. The memory 155 also includes charging profiles and characteristics of various batteries and/or operational characteristics of various output devices. For example, the memory 155 can store the charging profile of a lead-acid battery and other parameters associated with the battery such as a gain parameter. The charging profiles can be stored as tables or equations that can be used to calculate a charging profile. A user can program the memory with a specific output device profile or the controller 150 can sense the characteristics the output device attached to the supply output. In addition, the processor 152 is communicatively coupled to the maximum power point tracker 160 and the overload module 165.

The maximum power point tracker 160 is configured to implement a maximum power point tracking algorithm. Where a power source is connected to a load through a power regulator, a maximum power point tracking algorithm determines the power regulator characteristics that will result in a maximum amount of power produced by the power source. A power regulator presents an impedance to a power source that depends on the load and the regulator's characteristics. A maximum power point tracking algorithm can be used to alter the effective impedance seen by a power source so that the current and voltage produced by that power source will result in a maximum power (e.g. $P=I*V$). In cases where the current-voltage relationship of a power source is not linear, e.g. a photovoltaic cell, there will be at least one maximum power point.

Figure 2:
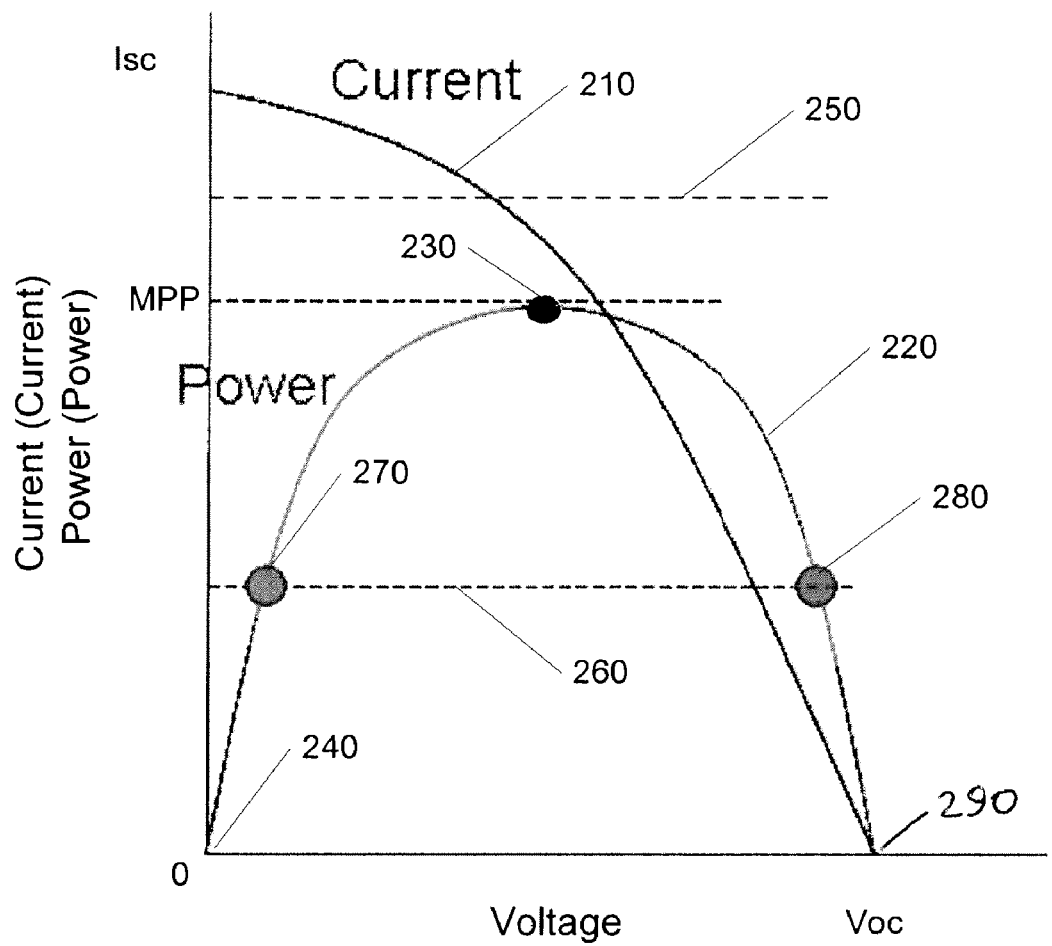
FIG. 2 is a graph of a maximum power point tracking algorithm in accordance with a representative embodiment.

Referring to FIG. 2, a graph of a maximum power point tracking algorithm in accordance with a representative embodiment is shown. The graph of the maximum power point tracking algorithm, with regard to a photovoltaic device, shows voltage versus current (scale one) and power (scale two). The current of the photovoltaic device is shown as current trace 210 (labeled "Current"). The power of the photovoltaic device is shown as power trace 220 (labeled "Power"). With respect to current trace 210, at 0 V, current is at Isc A, whereas at Voc (point 290), current is 0 A. With respect to power trace 220, at 0 V (point 240), power is 0 W. At Voc (point 290), power is 0 W. Power peaks at a maximum power point 230 (labeled "MPP").

A MPPT algorithm maximizes input power, but does not otherwise concern itself with exactly how many watts of power are at the input. Power is maximized, but a specific number of watts is not regulated. A maximum power point tracking algorithm searches for this maximum power point, for example, by calculating it or through trial and error. One trial and error MPPT method is where a power system is perturbed periodically. If the system produces more power after the disturbance, the new state is chosen.

Referring again to FIG. 1, the overload module 165 determines when an overload condition exists or is about to occur. Specifically, the overload module 165 compares the power available from the input source to a target power of the output device 120. The target power of the output device 120 is related to its charging profile and other parameters as discussed in further detail below. The processor 152 provides the target power to the overload module 165 and receives an overload determination from the overload module 165. Alternatively, the overload module 165 can be integrated into the processor 152.

The power supply 140 can be, for example, a switching power supply. The switching power supply can be a buck-type regulator; however, other configurations can be used such as boost-type, buck-boost-type, etc. Preferably, the buck-type regulator has a filtering inductor to smooth its output current. A switching power supply is typically based on pulse width modulation (PWM) control. The output of the buck-type regulator can be altered by changing the duty cycle of a pulse used to control the transistors of the switching power supply. Alternatively, other power supply configurations, such as a transformer based system, can be used.

Figure 3:
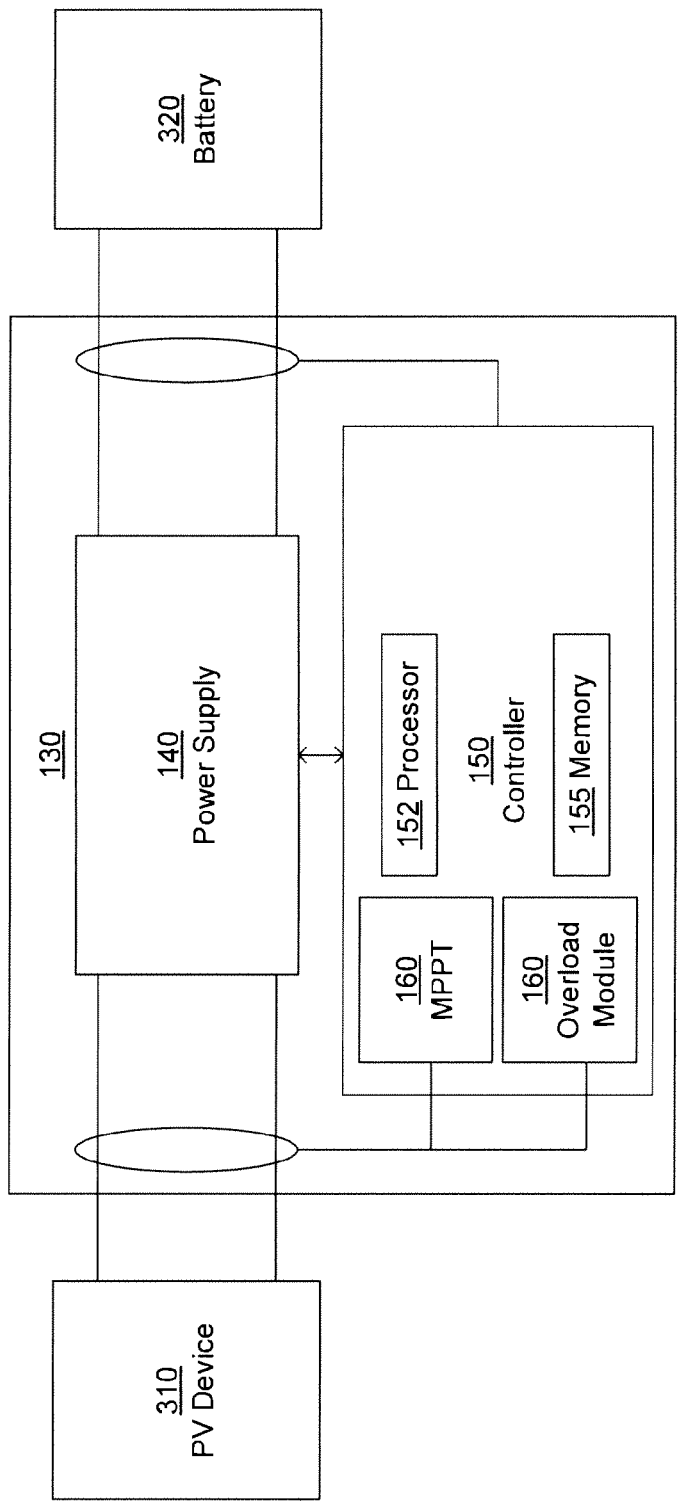
FIG. 3 is a diagram of a photovoltaic power regulation system in accordance with a representative embodiment.

Referring to FIG. 3, a diagram of a photovoltaic power regulation system in accordance with a representative embodiment is shown. The photovoltaic power regulation system includes a photovoltaic device 310, a battery 320, and a power regulator 130. The photovoltaic device 310 is electrically connected to a supply input of the power regulator 130. A supply output of the power regulator 130 is electrically connected to the battery 320.

As described above, the photovoltaic device 310 can be a single cell, an array, or an array of arrays. The battery 320 can be any battery including a lead-acid, valve regulated lead-acid (VRLA) (a.k.a. a sealed lead-acid battery), alkaline, nickel-iron, nickel-cadmium, nickel hydrogen, nickel-metal hydride, nickel-zinc, lithium ion, lithium polymer, lithium iron phosphate, lithium sulfur, nano titanate, thin film lithium, zinc-bromine, vanadium redox, sodium-sulfur, molten salt, super iron or silver zinc battery. The power regulator 130 includes a power supply 140 and a controller 150. The controller 150 controls the power supply 140, for example, by regulating the switching characteristics. The controller 150 can be integrated into the power supply 140. The controller 150 includes a maximum power point tracker 160, an overload module 165, a processor 152, and a memory 155. The controller can be one integrated circuit or separate modules.

Figure 4:
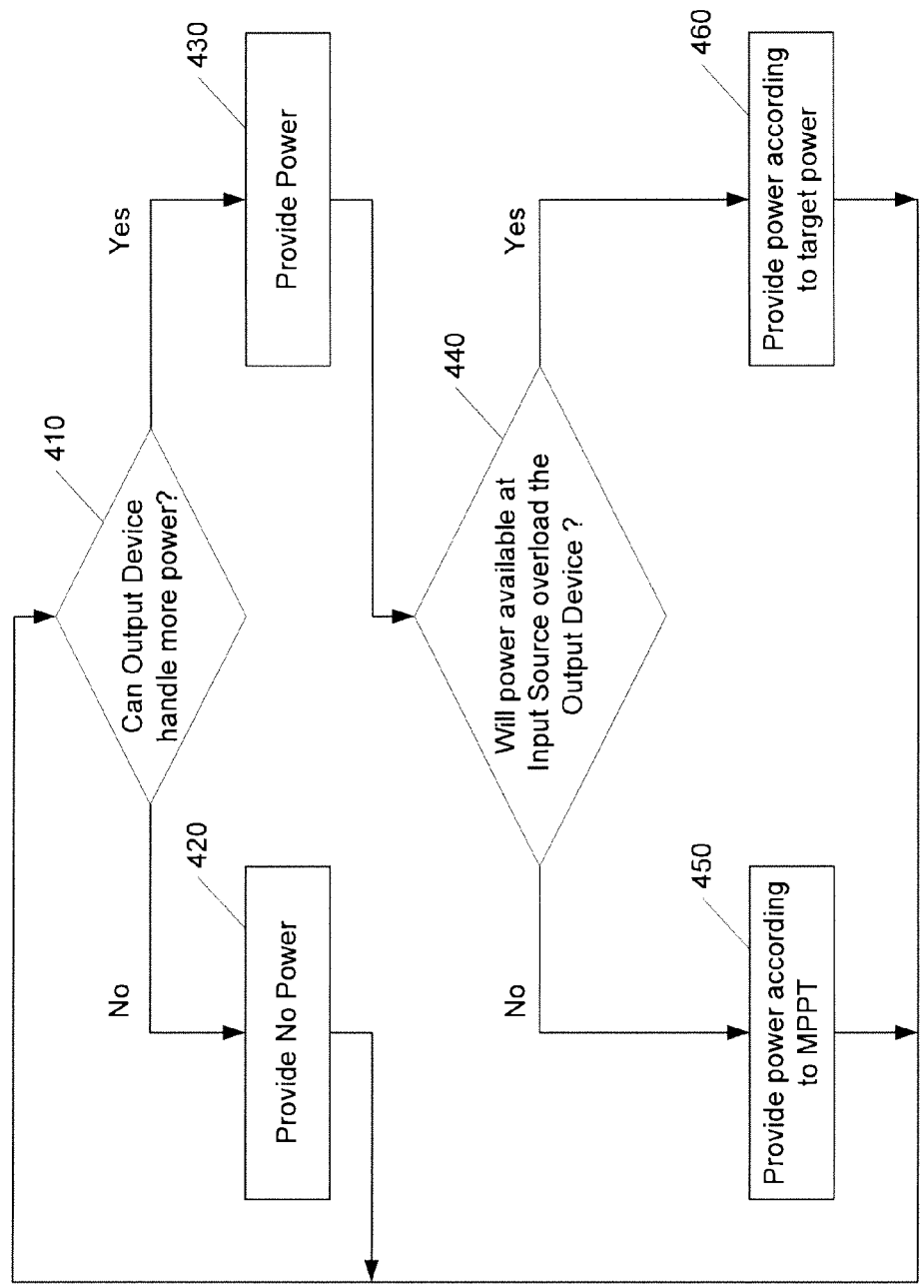
FIG. 4 is a flowchart of a method of power regulation in accordance with a representative embodiment.

Referring to FIG. 4, a flowchart of a method of power regulation in accordance with a representative embodiment is shown. For purposes of explanation, the method is described as the case where the input device is a photovoltaic device and the output device is a battery as shown in FIG. 3. In an operation 410, the controller determines if the output device cannot or should not use power. For example, when the output device is a battery, the battery cannot or should not use power when the battery is fully charged. The battery can use more power when the battery is not fully charged. Alternatively, where an electrical load is the output device, the current or voltage needs of the electrical load can be determined, for instance, by a feedback circuit or known limitations of the device.

In a representative embodiment, the determination if the output device cannot or should not use power can be based on a target power. The controller determines the target power based on a target voltage. The controller determines a target voltage (Vtarget) based on a charging profile, stored in memory, and on a current state of the battery. For instance, a lead acid battery that is partially charged has a target voltage of 14.4 V. An error voltage is equal to Vtarget−Vload, where Vload is the voltage across the battery. The target power (Ptarget) can be calculated from the battery error voltage. Ptarget is a function of (Vtarget−Vload). Depending on how close Vload is to Vtarget, more or less power will be requested from the source. For example, Ptarget equals Gp*(Vtarget−Vload), where Gp is a gain term. Gp is based on characteristics of the output device. The gain Gp of Watts/Volt can be constructed with knowledge of the particular battery to be charged. In other embodiments, the gain term does not need to be a scalar multiplier; for example, the gain term can be exponential or itself a function of other variables such as the life of an output device, etc.

If the controller determines that the output device cannot or should not use power, the power supply is controlled in operation 420 so that no power is provided to the output device. For example, if Ptarget is negative, as it might be if the battery voltage is higher than the target voltage, then Ptarget can clamp to 0 W. In this case, the system can shut off. The input to the power regular can be open circuited. The controller can also operate the power supply with a 0% duty cycle. Alternatively, the power can be diverted elsewhere. Referring again to FIG. 2, the power regulator would be operating at a zero power level 290 (e.g., at Voc). Referring again to FIG. 4, the method returns to operation 410 and repeats.

If the controller determines that the output device can or should use power, in an operation 430, the controller will provide power to the output device. However, the controller further determines how the power will be provided.

In an operation 440, the controller determines if a power available at the input source will overload the output device. For example, the overload module of the controller compares an instantaneous power of the photovoltaic device to an overload power of the battery. In another embodiment, the overload module of the controller compares a maximum power of the photovoltaic device to an overload power of the battery. The overload power of the battery can be based on the charging profile of the battery. For example, with regard to a lead-acid battery, the optimal initial charging voltage is about 14.4 V. When the battery is in deep discharge, it can be desirable to charge at a low amperage (e.g. 1 amp) in order to replenish the charge in the battery in a fashion that distributes charge deeper within the plates of the battery. Thus, preferably, 14.4 watts of power would be desired for recharging the battery. Suppose, for example, the PV device is producing 20 watts at the input to the power supply. At 14.4 V, the battery would receive 1.4 A from the power supply. Thus, the battery would be overloaded by the extra 0.4 A. Alternatively, at 1 A, the battery would receive 20 V from the power supply. Since, the gassing voltage of a lead-acid battery is 14.4 V, voltage in excess of 14.4 V will produce explosive hydrogen gas thereby creating a safety risk. Thus, the battery would be overloaded by the extra 5.6 V. Each battery type has its own overload conditions. For example, overload in a nickel-metal hydride battery can be determined by the change in charging voltage necessary. Likewise, a electrical load can have similar current, voltage, and wattage conditions.

If the power available at the input source would not overload the output device, in an operation 450, the power supply provides power to the output device from the input source according to a maximum power point tracking algorithm. Thus, if Ptarget is more than the available maximum PV input power, then normal MPPT ensues. In this case, there is no way that the system can retrieve Ptarget power from the source. The system will try to reap as much as it can. In other words, if the input device, operating at the maximum power point, will not overload the output device, the controller will configure the power supply to allow substantially all of the power of the input device to pass from the power supply input to the power supply output. For example, the power supply can be switched to provide an impedance as directed by the maximum power point tracker. Alternatively, the power supply can include a MPPT section and a bypass. However, switching power supply circuits which use PWM can be more efficient than circuits with pass devices. Referring again to FIG. 2, the power regulator would be operating at the maximum power point 230. The target power (Ptarget) would be at power level 250. Referring again to FIG. 4, the method returns to operation 410 and repeats.

If the power available at the input source would overload the output device, in an operation 460, the power supply provides power to the output device from the input source according to the target power. For example, if Ptarget is less than the available maximum or instantaneous power point of the photovoltaic device, then the controller adjusts the power supply to output Ptarget. Thus, overload is prevented. In addition, the controller can clamp the output of the power supply to a particular voltage, current or power so that the output device is not damaged. Referring again to FIG. 2, the power regulator would be operating at a matched power level 260. The power regulator could operate at first matched power 270 or second matched power 280. In a matched power mode, the duty cycle is changed until the input power equals the target. It does not matter whether the PV input device starts close to Voc or close to Isc in current curve 210. Changes in the duty cycle result in changes in input power. The controller will know where in the current curve 210 the system presently operates by detecting direction of change in power in response to change in duty cycle. The controller, operating a matched power algorithm, can ensure that the operating condition is at the second matched power 280 rather than the first matched power 270 by detecting whether power increases or decreases versus voltage. In the region of the second matched power 280, power increases as voltage decreases. In the region of the first matched power 270, power deceases as voltage decreases. Referring again to FIG. 4, the method returns to operation 410 and repeats.

In this representative embodiment, Ptarget is an overriding aspect to the controller. The controller will constantly try to change the input power to equal Ptarget. MPPT or another operation is chosen as a response to how much input power there is relative to Ptarget. Because Ptarget is constructed as a function of (Vtarget−Vload), it is possible to use Ptarget as a means to try to make Vload to equal Vtarget. When Vload is too low, Ptarget increases. When Vload is too high, then Ptarget can go negative, or clamp at 0 W. When Vload is within range of Vtarget, then Ptarget can be small. Thus, proportional control, as discussed further below, may be sufficient to control Vload by use of Ptarget. Particularly in battery systems, where the battery itself presents an extremely slow pole, there is no need for further integration control. In other embodiments, other calculations of Ptarget that add poles and zeros to the error signal (Vtarget−Vload) are possible. With a closed loop to control Vload, any slow output voltage trajectory can easily be achieved. Hence, with a properly operating system, a battery charging profile can be effected. The difference between the output voltage and the target voltage will determine how much power is needed from the input source. Advantageously, a photovoltaic device can directly charge a battery without overcharging or overloading the battery while deriving maximum efficiency from the photovoltaic device.

Figure 5:
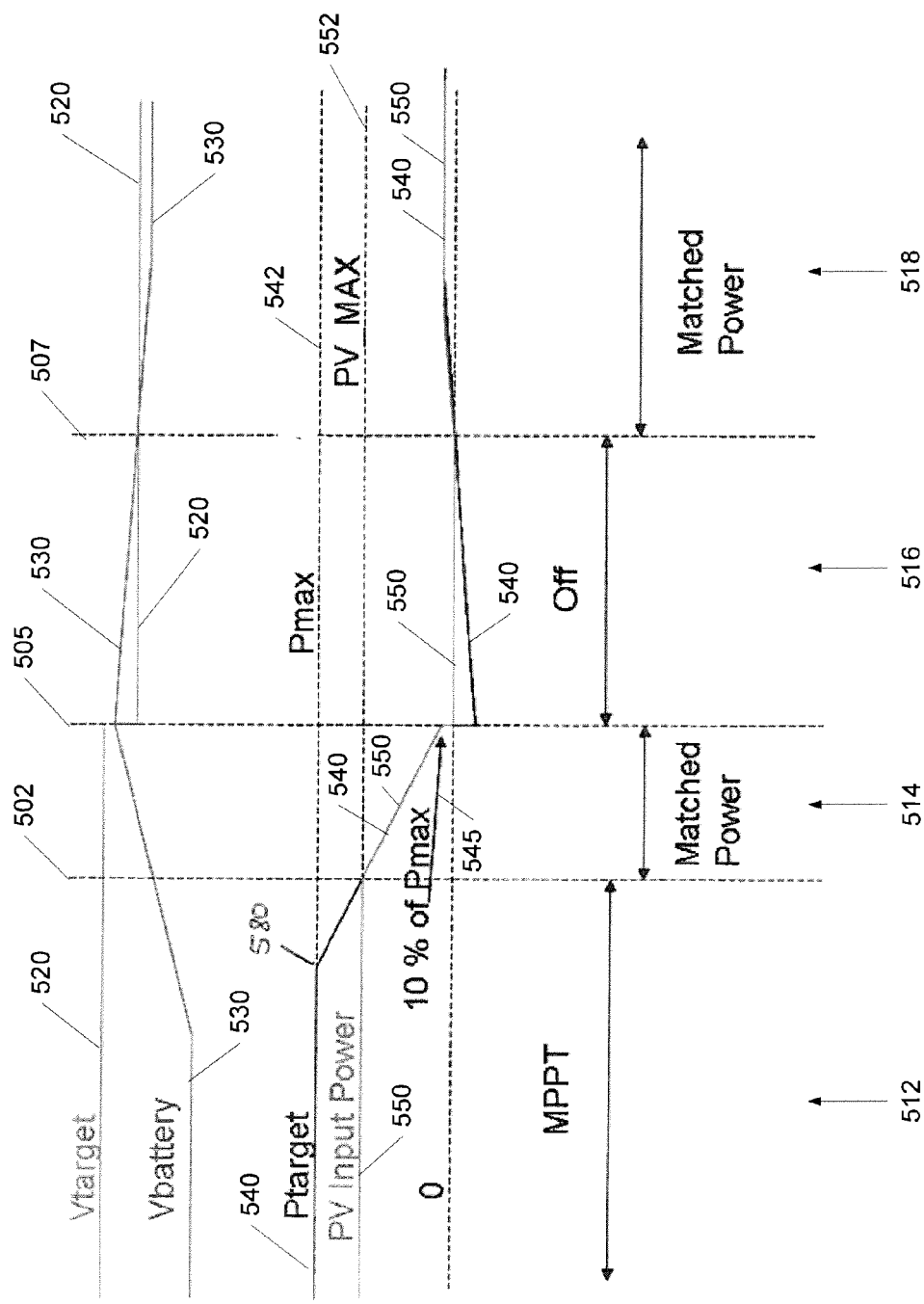
FIG. 5 is a graph of power regulation over a time period in accordance with a representative embodiment.

Referring to FIG. 5, a graph of power regulation over a time period in accordance with a representative embodiment is shown. The top two lines are a plot of hypothetical voltage versus time and the middle two lines are plot of the corresponding power versus time. The bottom region shows the operating mode as a function of time. For purposes of explanation, power regulation for a period of time where the input device is a photovoltaic device and the output device is a battery as shown in FIG. 3. In this example, the photovoltaic device charges a sealed lead-acid battery using a power regulator as described above.

A battery can be charged, for example, by regulating its voltage. In the case of a sealed lead-acid battery, the target power, Ptarget 540, is calculated as Gp*(Vtarget 520−Vload), where Vload is battery voltage, Vbattery 530. During charging in periods 512 and 514, Vtarget 520 is a first value (e.g. 14.4 V). As the battery charges, Vbattery 530 approaches target voltage, Vtarget 520. Once the battery voltage comes within a certain range of Vtarget 520 and/or once the power demanded from the input, PV Input Power 550, is one tenth (or another predetermined fraction) of the maximum allowed input power, Pmax 542 (i.e., the overload power or clamping power), then at point 545 at time 505 Vtarget 520 changes to a slightly lower value (e.g. 13.8 V). Vtarget 520 remains at this slightly lower value during periods 516 and 518.

Initially during period 512, Ptarget wants to be high, for example greater than or equal to Pmax 542, where Pmax 542 is a clamping power. The system might clamp Ptarget 540 to Pmax 542 because the charging current cannot exceed a certain maximum level. As the battery slowly charges, Ptarget 540 starts to decay at point 580. In period 512, the system operates according to a maximum power point tracking algorithm (MPPT) because the power available from the photovoltaic device 552 (PV_MAX) falls short of the power that the system can use (Pmax 542 and Ptarget 540). Thus, during period 512, the power demanded from the photovoltaic device 550 (PV Input Power) is equal to the power at a maximum power point, i.e. the power available from the photovoltaic device 552 (PV_MAX).

When the voltage exceeds a certain level, Ptarget 540 starts to ramp from Pmax 542 down to 0 W. When Ptarget is below PV_MAX, the system exits MPPT at time 502. During period 514, the system operates in a matched power mode where the power demanded from the photovoltaic device 550 (PV Input Power) is equal to Ptarget 540.

At time 505, the power demanded from the photovoltaic device 550 (PV Input Power) is one tenth of the maximum allowed input power, Pmax 542 (at point 545), and Vtarget 520 changes to a lower value. Hence, Vtarget 520 is less than Vbattery 530. Ptarget 540 becomes negative, and the system turns off during period 516.

Eventually, at time 507, Vbattery 530 decays to slightly below Vtarget 520. During period 518, there is only a small demand for power and the system operates in a matched power mode again where the power demanded from the photovoltaic device 550 is equal to Ptarget 540. This steady-state operating condition of being slightly below the target voltage can occur because of nominal leakage current in the battery.

The transition amongst the MPPT, matched power mode, and off regions can be seamless. In the matched power mode, in MPPT, and in off modes, the controller controls the switching regulator's duty. The system controller simply controls the duty cycle with an MPPT algorithm, or using a matched power method, or by setting to 0%.

Figure 6:
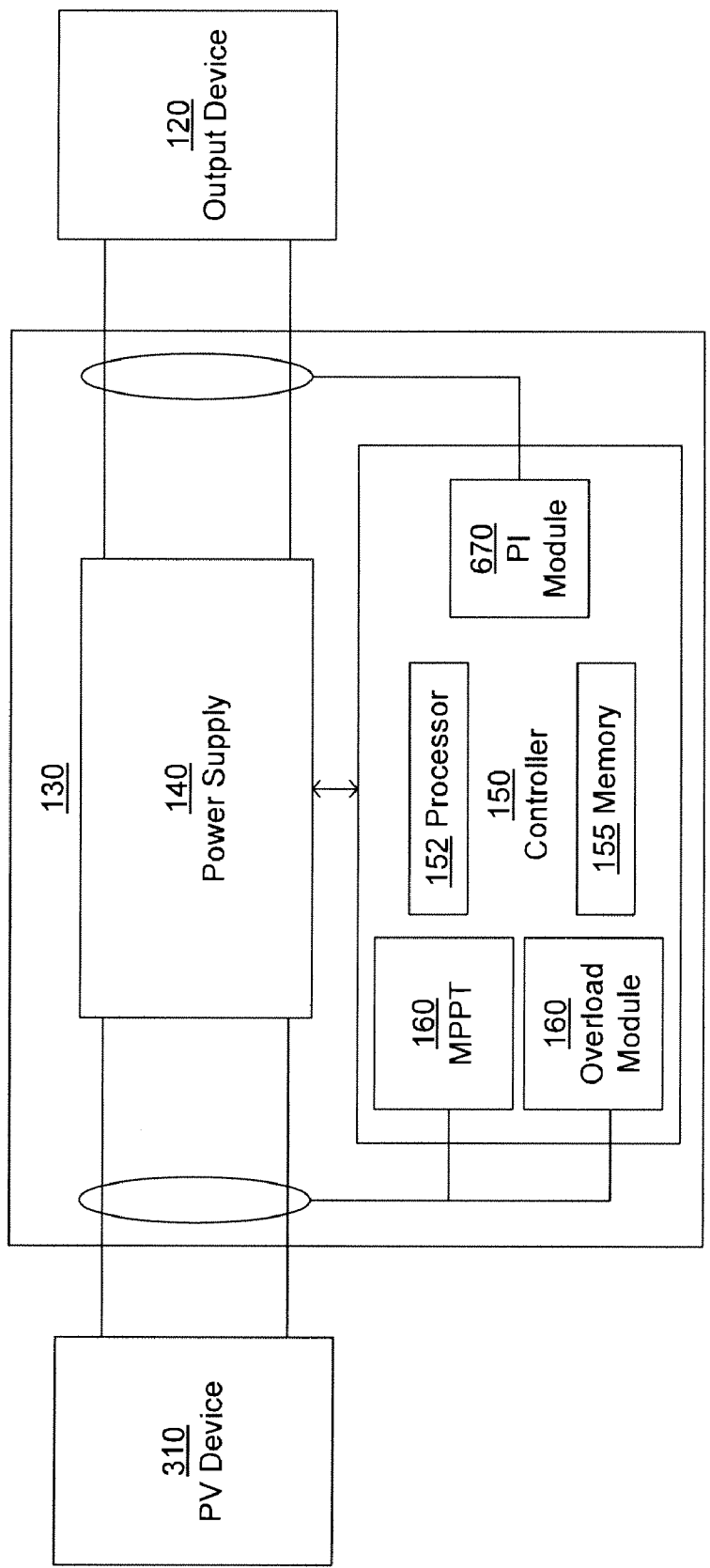
FIG. 6 is a diagram of a photovoltaic power regulation system incorporating a proportional-integral controller in accordance with a representative embodiment.

Referring to FIG. 6, a diagram of a photovoltaic power regulation system incorporating a proportional-integral controller in accordance with a representative embodiment is shown. The photovoltaic power regulation system includes a photovoltaic device 310, an output device 120, and a power regulator 130. The photovoltaic device 310 is electrically connected to a supply input of the power regulator 130. A supply output of the power regulator 130 is electrically connected to the output device 120.

As described above, the photovoltaic device 310 can be a single cell, an array, or an array of arrays. The output device 120 can be any electrical load. The electrical load can be, for example, an appliance, a power converter, a house grid, or any other electrical device that preferably uses a constant voltage or current.

The power regulator 130 includes a power supply 140 and a controller 150. The controller 150 controls the power supply 140, for example, by regulating the switching characteristics. The controller 150 can be integrated into the power supply 140. The controller 150 includes a maximum power point tracker 160, an overload module 165, a processor 152, a memory 155, and a proportional-integral module 670. The controller can be one integrated circuit or separate modules.

The proportional-integral module 670 is a proportional-integral algorithm or controller. The proportional-integral module 670 "mimics" the battery discussed above. The proportional-integral algorithm creates Ptarget so as to provide a constant voltage, current, or power at the output device 120. Vtarget, or some other target may exist. The output device 120 can provide feedback to the controller 150, which subsequently uses that feedback and proportional-integral controller 670 to create Ptarget. Alternatively, the proportional-integral module 670 can also be a proportional controller, or a PID controller. Advantageously, the photovoltaic power regulation system incorporating a proportional-integral controller can be used to directly supply power to a device while maintaining maximum efficiency of the photovoltaic device.

The methods and systems described herein are well suited to charging a battery from a power limited input such as a PV device. It is noted, however, that particularly with proportional-integral control, output parameters can be regulated out of the context of battery charging. These systems can act as constant voltage, constant current, or even constant power sources. When the source power is too large, then matched power operation occurs. When the source power is not enough, then the output may reasonably sag while the controller reaps the maximum available input power.

These methods and systems are also amenable to applications with power limited input sources other than PV devices; PV devices are described herein as one example of such input sources. Electrical sources such as those created through transducers by steam turbines, wind turbines, heat generation, etc., are effectively power limited. As such, these alternative input sources may be used with the systems and methods described herein instead of or in addition to PV device input sources.

The foregoing description of the exemplary embodiments have been presented for purposes of illustration and of description. It is not intended to be exhaustive or to limit the invention to the precise form disclosed, and modifications and variations are possible in light of the above teachings or may be acquired from practice of the invention. For example, the described exemplary embodiments focused on an representative implementation of a photovoltaic device and battery. The present invention, however, is not limited to a representative implementation as described and depicted. Those skilled in the art will recognize that the device and methods of the present invention may be practiced using various combinations of components. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of providing power, comprising:
providing no power to an output device if the output device cannot or should not use power; and
providing power to the output device from an input source if the output device can use power as follows:
providing power to the output device from the input source according to a maximum power point tracking algorithm when a power available at the input source would not overload the output device; and
providing power to the output device from the input source according to a target power when the power available at the input source would overload the output device.

2. The method of claim 1, wherein the input source comprises a photovoltaic device.

3. The method of claim 2, wherein the output device comprises a battery.

4. The method of claim 3, wherein the target power is based on a charging profile of the battery.

5. The method of claim 4, wherein when the output device cannot or should not use power condition occurs when the battery is fully charged and wherein when the output device can use more power condition occurs when the battery is not fully charged.

6. The method of claim 5, further comprising calculating the target power based on a difference between a target voltage and a load voltage of the battery, wherein the target voltage is associated with the charging profile of the battery.

7. The method of claim 6, wherein the step of calculating the target power further comprises multiplying the difference between the target voltage and the load voltage by a gain factor associated with characteristics of the battery.

8. The method of claim 7, wherein the step of calculating the target power further comprises limiting the target power to a clamping value.

9. The method of claim 7, wherein providing power to the battery from the input source according to the target power when the power available at the input source would overload the battery comprises matching the power provided from the input source to the target power.

10. The method of claim 9, wherein matching the power provided from the input source to the target power is performed by control of a switching power supply.

11. The method of claim 2, further comprising calculating the target power based on a proportional-integral control algorithm.

12. The method of claim 2, further comprising calculating the target power based on a proportional control algorithm.

13. The method of claim 1, further comprising determining when the power available at the input source would or would not overload the output device based on a comparison of a maximum power of the photovoltaic device to the target power.

14. The method of claim 1, further comprising determining when the power available at the input source would or would not overload the output device based on a comparison of an instantaneous power of the photovoltaic device the target power.

15. The method of claim 3, wherein the battery is selected from a lead-acid, valve regulated lead-acid (VRLA), alkaline, nickel-iron, nickel-cadmium, nickel hydrogen, nickel-metal hydride, nickel-zinc, lithium ion, lithium polymer, lithium iron phosphate, lithium sulfur, nano titanate, thin film lithium, zinc-bromine, vanadium redox, sodium-sulfur, molten salt, super iron or silver zinc battery.

16. A power apparatus, comprising:
a power supply comprising a supply input and a supply output configured to be electrically connected to an output device; and
a controller for controlling the power supply, the controller comprising a maximum power point tracker that monitors the supply input;
wherein the controller is configured to cause the power supply to:
provide no power to the supply output if the output device cannot or should not use power; and
provide power to the supply output from the supply input if the output device can use power as follows:
provide power to the supply output from the supply input according to a maximum power point tracking algorithm performed by the maximum power point tracker when power available at the supply input would not overload the output device; and
provide power to the supply output from the supply input according to a target power when the power available at the supply input would overload the output device.

17. The apparatus of claim 16, wherein the supply input is configured to be electrically connected to a photovoltaic device.

18. The apparatus of claim 17, wherein the output device comprises a battery.

19. The apparatus of claim 18, wherein when the output device cannot or should not use power condition occurs when the battery is fully charged and wherein when the output device can use power condition occurs when the battery is not fully charged.

20. The apparatus of claim 19, further comprising an overload module that compares the target power to the power at the supply input.

21. The apparatus of claim 20, wherein the target power is based on a charging profile of the battery stored in a memory of the controller.

22. The apparatus of claim 21, wherein the power supply comprises a switching power supply.

23. The apparatus of claim 22, wherein the switching power supply comprises a pulse-width-modulated buck regulator.

24. The apparatus of claim 16, further comprising a proportional-integral controller responsive to the supply output wherein the target power is based on a value provided by the proportional-integral controller.

25. The apparatus of claim 16, further comprising a proportional controller responsive to the supply output wherein the target power is based on a value provided by the proportional controller.

26. The apparatus of claim 16, wherein the controller performs a seamless transition between any two of an off mode in which no power is provided to the supply, a maximum power point tracking algorithm mode, and a matched power mode in which power to the supply output is provided according to the target power, by controlling a duty cycle of the power supply.

27. A charging system, comprising:
a photovoltaic device;
a charging device electrically connected to the photovoltaic device, the charging device comprising a maximum power point tracker and a power supply; and a battery electrically connected to the charging device, wherein the charging device is configured to:
provide no power to the battery if the battery is fully charged; and
provide power to the battery from the photovoltaic device if the battery is not fully charged as follows:
provide power to the battery from the photovoltaic device according to a maximum power point tracking algorithm performed by the maximum power point tracker when a maximum power of the photovoltaic device would not overload the battery; and
provide power to the battery from the photovoltaic device according to a target power when the maximum power of the photovoltaic device would overload the battery.

28. The system of claim 27, wherein the target power is based on a charging profile of the battery.

29. The system of claim 28, wherein the charging device is further configured to:
monitor a battery voltage;
compare voltage difference between the battery voltage and a target voltage which is based on the charging profile of the battery; and
calculate the target power by adjusting the voltage difference by a gain term based on characteristics of the battery.

30. The system of claim 29, wherein the battery is selected from a lead-acid, valve regulated lead-acid (VRLA), alkaline, nickel-iron, nickel-cadmium, nickel hydrogen, nickel-metal hydride, nickel-zinc, lithium ion, lithium polymer, lithium iron phosphate, lithium sulfur, nano titanate, thin film lithium, zinc-bromine, vanadium redox, sodium-sulfur, molten salt, super iron or silver zinc battery.

* * * * *